(12) United States Patent
Pang (10) Patent No.: US 10,698,979 B2
(45) Date of Patent: Jun. 30, 2020

(54) METHOD AND SYSTEM FOR DETERMINING RELATIONSHIP BETWEEN USERS BASED ON PHYSICAL ADDRESSES OF WIRELESS SIGNAL SOURCES

(71) Applicant: ALIBABA GROUP HOLDING LIMITED, George Town, Grand Cayman (KY)

(72) Inventor: Lei Pang, Beijing (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 791 days.

(21) Appl. No.: 14/841,966

(22) Filed: Sep. 1, 2015

(65) Prior Publication Data
US 2016/0063088 A1    Mar. 3, 2016

(30) Foreign Application Priority Data

Sep. 2, 2014   (CN) .......................... 2014 1 0443214

(51) Int. Cl.
*G06F 17/00*   (2019.01)
*G06F 17/30*   (2006.01)
(Continued)

(52) U.S. Cl.
CPC .. *G06F 17/30598* (2013.01); *G06F 17/30241* (2013.01); *G06Q 30/02* (2013.01);
(Continued)

(58) Field of Classification Search
None
See application file for complete search history.

(56) References Cited

U.S. PATENT DOCUMENTS

| 6,618,593 B1 | 9/2003 | Drutman et al. |
| 7,127,261 B2 | 10/2006 | Van Erlach |

(Continued)

FOREIGN PATENT DOCUMENTS

| CN | 101090404 A | 12/2007 |
| CN | 101360275 A | 2/2009 |

(Continued)

OTHER PUBLICATIONS

PCT International Search Report and the Written Opinion dated Dec. 8, 2015, issued in corresponding International Application No. PCT/US15/47968 (9 pages).

(Continued)

*Primary Examiner* — Anhtai V Tran
(74) *Attorney, Agent, or Firm* — Finnegan, Henderson, Farabow, Garrett & Dunner, LLP (57) ABSTRACT

Systems and methods are provided for determining relationship between users. The systems and methods may include receiving, from a target user terminal and one or more other user terminals, one or more physical addresses associated with one or more wireless signal sources. The system may determine one or more relationships between a target user associated with the target user terminal and one or more other users associated with the one or more other user terminals based on the received one or more physical addresses. The one or more wireless signal sources are within search ranges of the target user terminal and the one or more other user terminals.

24 Claims, 3 Drawing Sheets

(51) Int. Cl.
*H04L 29/08* (2006.01)
*G06Q 50/00* (2012.01)
*G06Q 30/02* (2012.01)

(52) U.S. Cl.
CPC .......... *G06Q 50/01* (2013.01); *H04L 67/303* (2013.01); *H04L 67/18* (2013.01)

(56) References Cited

U.S. PATENT DOCUMENTS

| | | |
|---|---|---|
| 7,907,579 B2 | 3/2011 | FitzGerald |
| 2002/0111173 A1* | 8/2002 | Hendrey ............ H04W 76/40 455/456.3 |
| 2005/0135305 A1* | 6/2005 | Wentink ............ H04B 7/2126 370/329 |
| 2006/0041663 A1 | 2/2006 | Brown et al. |
| 2007/0030824 A1 | 2/2007 | Ribaudo et al. |
| 2008/0097999 A1 | 4/2008 | Horan |
| 2010/0112989 A1* | 5/2010 | Andreasson ............ H04W 4/02 455/414.2 |
| 2011/0083101 A1 | 4/2011 | Sharon et al. |
| 2012/0250950 A1 | 10/2012 | Papakipos et al. |
| 2012/0329475 A1 | 12/2012 | Ribaudo et al. |
| 2013/0166555 A1 | 6/2013 | Pfaff |
| 2014/0040030 A1 | 2/2014 | Winters et al. |
| 2014/0222954 A1 | 8/2014 | Vaccari et al. |
| 2014/0244834 A1* | 8/2014 | Guedalia ............ H04L 67/16 709/224 |
| 2016/0044090 A1* | 2/2016 | Glickfield ............ H04L 67/10 709/204 |

FOREIGN PATENT DOCUMENTS

| | | |
|---|---|---|
| CN | 102892074 A | 1/2013 |
| CN | 103152704 A | 6/2013 |
| JP | 2010165097 A | 7/2010 |
| JP | 2013506338 A | 2/2013 |
| WO | WO 2010/001483 A1 | 1/2010 |
| WO | WO 2011/037505 A1 | 3/2011 |
| WO | WO 2014/073276 A | 5/2014 |
| WO | WO 2016/036755 A1 | 3/2016 |

OTHER PUBLICATIONS

Extended European Search Report in European Application No. 15838045.1-1854 (PCT/US2015/047968), pursuant to Rule 62 EPC, the supplementary European search report (Art. 153(7) EPC) and the European Search Opinion, dated May 24, 2017, 8 pages.
First Chinese Search Report issued in Chinese Application No. CN201410443214.6, dated May 28, 2018, 1 page.
First Chinese Office Action issued in Chinese Application No. CN201410443214.6, dated Jun. 4, 2018, 16 pages.
Search Report by Registered Search Organization by Industrial Property Cooperation Center in Japan in corresponding to Japanese Application No. 2017-508648, dated Jun. 27, 2019, 20 pages.
Waki et al., "Study of real world oriented informal communication support," Information Processing Society of Japan, Report of Research, vol. 91 No. 91, pp. 61-66 (1997).

* cited by examiner

METHOD AND SYSTEM FOR DETERMINING RELATIONSHIP BETWEEN USERS BASED ON PHYSICAL ADDRESSES OF WIRELESS SIGNAL SOURCES

CROSS-REFERENCE TO RELATED APPLICATION

This application is based upon and claims priority to Chinese Patent Application No. 201410443214.6, filed Sep. 2, 2014, the entire content of which is incorporated herein by reference.

TECHNICAL FIELD

The present disclosure generally relates to the field of computers and, more particularly, to a method and system for determining a relationship between users.

BACKGROUND

With the widespread application of mobile terminals and the prevalence of social networking media, network services are changing from being data-centric to being user-centric or user relationship-centric.

Using conventionally techniques, relationship between users can be obtained using data exchanged between the users. For example, a mobile Alipay Wallet will generate hundreds of millions of pieces of business data every day, and these business data generally include the data related to money transfer between users. Information about user relationships can be obtained from business data. As another example, user relationships can also be obtained from call records of the user, or the user's shopping data containing delivery addresses.

Based on these data, a specific association between two users can be determined. Such a specific association between users can include, for example, the users being the parties to a money transfer transaction, the users using the same delivery address for shopping, one of the user's phone number appearing in another user's call record, or the users being in the same geographic location (such as living in the same residence community or working in the same office district), and so on. A certain level of relationship between the users (e.g., whether the users have a close or intimate relationship) can be determined when such a specific association exists.

However, with the aforementioned conventional techniques, when there is no data exchanged between the users located in the same geographical location, it becomes difficult to accurately determine the relationship between the users, even if specific associations between the users exist.

SUMMARY

The present disclosure provides a computer-method for determining relationship between users. The method comprises receiving, from a target user terminal and one or more other user terminals, one or more physical addresses associated with one or more wireless signal sources. The method further comprises determining one or more relationships between a target user associated with the target user terminal and one or more other users associated with the one or more other user terminals based on the received one or more physical addresses. The one or more wireless signal sources are within search ranges of the target user terminal and the one or more other user terminals.

In some embodiments, the method further comprises receiving geographical location information associated with the received one or more physical addresses. The determining one or more relationships between a target user associated with the target user terminal and one or more other users associated with the one or more other user terminals based on the received one or more physical addresses comprises: determining, based on the received physical addresses, one or more candidate users whose relationship with the target user is to be determined; and determining the relationship between the target user and the one or more candidate users based on the received geographical location information.

In some embodiments, the determining one or more relationships between a target user associated with the target user terminal and one or more other users associated with the one or more other user terminals based on the received one or more physical addresses comprises: selecting a physical address from the physical addresses received from the target user terminal for a determination of the one or more relationships; and determining the relationship between the target user and other users based on the selected physical address and the physical addresses received from the one or more other user terminals.

In some embodiments, the selecting a physical address from the physical addresses received from the target user terminal comprises: clustering at least some of received physical addresses from the target user terminal based on received geometric location information; and selecting the physical address based on a result of the clustering.

In some embodiments, the method further comprises determining a number of times of receiving a physical address from the target user terminal; determining whether the number of times exceeds a threshold value; and responsive to determining that the number of times exceeds a threshold value, designating the physical address for the clustering.

In some embodiments, the selecting a physical address from the physical addresses received from the target user terminal for a determination of the one or more relationships comprises: determining a number of times of receiving a physical address from the target user terminal; determining whether the number of times exceeds a threshold value; and responsive to determining that the number of times exceeds a threshold value, selecting the physical address for the determination of the one or more relationships.

In some embodiments, the determining one or more relationships between a target user associated with the target user terminal and one or more other users associated with the one or more other user terminals based on the received one or more physical addresses comprises: determining whether at least one of the physical addresses received from the target user terminal and at least one of the physical addresses received from the one or more user terminals is identical; and responsive to determining that at least one of the physical addresses received from the target user terminal and at least one of the physical addresses received from the one or more user terminals is identical, determining that a level of user relationship exists between the target user and the one or more other users.

In some embodiments, the determining one or more relationships between a target user associated with the target user terminal and one or more other users associated with the one or more other user terminals based on the received one or more physical addresses comprises: responsive to determining that at least one of the physical addresses received from the target user terminal and at least one of the physical addresses received from the one or more user terminals is identical: determining a number of times of receiving the at least one of the physical addresses from the one or more other user terminals within a duration; determining whether the number of times exceeds a threshold value; and responsive to determining that the number of times exceeds a threshold value, determining that a level of user relationship exists between the target user and the one or more other users.

In some embodiments, the one or more relationships between a target user associated with the target user terminal and one or more other users associated with the one or more other user terminals are determined based on a time period associated with the received one or more physical addresses.

In some embodiments, wherein if the time period occurs during a working time period, the one or more relationships are determined to be a work colleague relationship; and wherein if the time period occurs during an after-work time period, the one or more relationships are determined to be a family relationship.

In some embodiments, the method further comprises providing interactive information to the target user and/or the one or more other users after determining that a user relationship exists between the target user and the one or more other users.

In some embodiments, the method further comprises receiving information about a specific event; and wherein the interactive information is provided based on the received information about the specific event.

The present disclosure also provides a device for determining relationship between users. The device comprises an address information obtaining unit configured to receive, from a target user terminal and one or more other user terminals, one or more physical addresses associated with one or more wireless signal source. The device further comprises a user relationship identifying unit configured to determine one or more relationships between a target user associated with the target user terminal and one or more other users associated with the one or more other user terminals based on the received one or more physical addresses. The one or more wireless signal sources are within one or more search ranges of the target user terminal and the one or more other user terminals.

In some embodiments, the device further comprises a location information obtaining unit configured to receive geographical location information associated with the received one or more physical addresses. The determination of one or more relationships between a target user associated with the target user terminal and one or more other users associated with the one or more other user terminals based on the received one or more physical addresses comprises the user relationship identifying unit being configured to: determine, based on the received physical addresses, one or more candidate users whose relationship with the target user is to be determined; and determine the relationship between the target user and the one or more candidate users based on the received geographical location information.

In some embodiments, the determination of one or more relationships between a target user associated with the target user terminal and one or more other users associated with the one or more other user terminals based on the received one or more physical addresses comprises the user relationship identifying unit being configured to: select a physical address from the physical addresses received from the target user terminal for a determination of the one or more relationships; and determine the relationship between the target user and other users based on the selected physical address and the physical addresses received from the one or more other user terminals.

In some embodiments, the selecting a physical address from the physical addresses received from the target user terminal comprises the user relationship identifying unit being configured to: cluster at least some of received physical addresses from the target user terminal based on received geometric location information; and select the physical address based on a result of the clustering.

In some embodiments, the user relationship identifying unit is further configured to: determine a number of times of receiving a physical address from the target user terminal; determine whether the number of times exceeds a threshold value; and responsive to determining that the number of times exceeds the threshold value, designate the physical address for the clustering.

In some embodiments, the selection of a physical address from the physical addresses received from the target user terminal for a determination of the one or more relationships comprises the user relationship identifying unit being configured to: determine a number of times of receiving a physical address from the target user terminal; determine whether the number of times exceeds a threshold value; and responsive to determining that the number of times exceeds the threshold value, select the physical address for the determination of the one or more relationships.

In some embodiments, the determination of one or more relationships between a target user associated with the target user terminal and one or more other users associated with the one or more other user terminals based on the received one or more physical addresses comprises the user relationship identifying unit being configured to: determine whether at least one of the physical addresses received from the target user terminal and at least one of the physical addresses received from the one or more user terminals is identical; and responsive to determining that at least one of the physical addresses received from the target user terminal and at least one of the physical addresses received from the one or more user terminals is identical, determine that a level of user relationship exists between the target user and the one or more other users.

In some embodiments, the determination of one or more relationships between a target user associated with the target user terminal and one or more other users associated with the one or more other user terminals based on the received one or more physical addresses comprises the user relationship identifying unit being configured to: responsive to determining that at least one of the physical addresses received from the target user terminal and at least one of the physical addresses received from the one or more user terminals is identical: determine a number of times of receiving the at least one of the physical addresses from the one or more other user terminals within a duration; determine whether the number of times exceeds a threshold value; and responsive to determining that the number of times exceeds a threshold value, determine that a level of user relationship exists between the target user and the one or more other users.

In some embodiments, the one or more relationships between a target user associated with the target user terminal and one or more other users associated with the one or more other user terminals are determined based on a time period associated with the received one or more physical addresses.

In some embodiments, if the time period occurs during a working time period, the one or more relationships are determined to be a work colleague relationship; and wherein if the time period occurs during an after-work time period, the one or more relationships are determined to be a family relationship.

In some embodiments, the device further comprises an information pushing unit configured to provide interactive information to the target user and/or the one or more other users after determining that a user relationship exists between the target user and the one or more other users.

In some embodiments, the information pushing unit is further configured to receive information about a specific event. The interactive information is provided based on the received information about the specific event.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

The present disclosure provides a method and a system for determining a relationship between users. In some embodiments, the method comprises: receiving, from a target user terminal and one or more other user terminals, one or more physical addresses associated with one or more wireless signal sources; and determining one or more relationships between a target user associated with the target user terminal and one or more other users associated with the one or more other user terminals based on the received one or more physical addresses. The one or more wireless signal sources are within one or more search ranges of the target user terminal and the one or more other user terminals.

Since the relationship between the target user and other users can be determined based on information about the physical addresses of wireless signal sources provided by the target user terminal (associated with the target user) and the other user terminals (associated with the other users), the relationship between the target user and other users can be accurately determined even if there is no data exchanged between the target user and other users.

Figure 1:
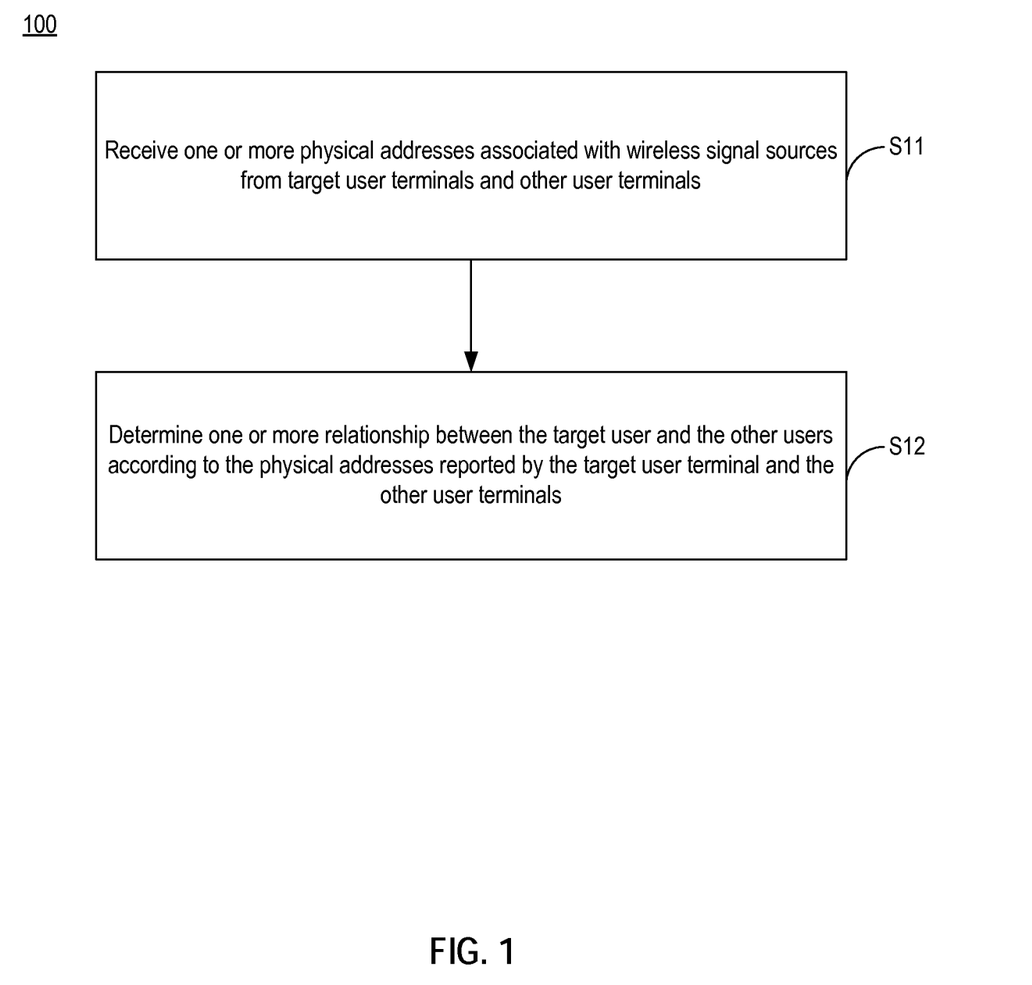
FIG. 1 is a flowchart of an exemplary method for determining a relationship between users, consistent with embodiments of the present disclosure.

FIG. 1 is a flowchart of an exemplary method 100 for determining a relationship between users, consistent with embodiments of the present disclosure. Method 100 can be performed by a computer, a server, or any computer system configured to determine user relationship. While the method is described as being performed by a system, it is appreciated that different devices can also perform different steps of method 100. Referring to FIG. 1, method 100 includes the following steps.

In step S11, a system receives one or more physical addresses associated with wireless signal sources from target user terminal and other user terminals.

In some embodiments, the system receives the physical addresses associated with the wireless signal sources from one or more user terminals associated with the target user and other users. The wireless signal sources can be within a search range of the user terminals and have been discovered by the user terminals, and can be connected or not connected to the user terminals.

The wireless signal source described herein can include but is not limited to: an Access Point (AP) of a Wireless-Fidelity (Wi-Fi) network, a signal source emitting a Bluetooth signal, etc. The physical address of the wireless signal source may be but is not limited to a Media Access Control (MAC) address. In some embodiments, the physical address can be represented by an identifier configured to identify the wireless signal source.

In some embodiments, the user terminals can periodically (e.g., at one-hour interval) report to the system the physical addresses of all of the wireless signal sources discovered, at the time of reporting, by the user terminals.

In some embodiments, a user terminal can also report to the system the physical addresses of all of the wireless signal sources discovered, when the user terminal switches connection between different wireless signal sources.

In some embodiments, the user terminals can also report, together with the physical addresses of the wireless signal sources, geographical location information of the user terminals, when the user terminals discover the wireless signal sources. In some embodiments, the geographical locations can be provided by a Global Positioning System (GPS) as part of the user terminals, or by any suitable means.

In some embodiments, the system can also be configured to receive the physical addresses at a specific time period based on the geographical locations of the user terminals. The configuration can be made based on a consideration that different types of users (e.g., a residential user, a user at work in an office, etc.) may report the physical addresses of wireless signal sources at different rates. Therefore, to conserve system and network resources, the system can also be configured to receive reporting of physical addresses at different time periods based on different types of users.

For example, based on the geographical locations of the user terminals, and additional information associated with these geographical locations (e.g., area coordinates, building types within the area represented by the area coordinates, etc.), the system can determine that the target user and other users are located in a residence community. The system can also determine that during an after-work time (e.g., 7:00 pm-12:00 am), the system can expect to receive more frequent reporting of physical addresses of wireless signal sources in a residence community than during a work time (e.g., 9:00 am-5:00 pm). Based on these determinations, the system can be configured to only receive reporting of physical addresses from the target user terminal and the other user terminals during the after-work time.

In step S12, the system determines one or more relationships between the target user and the other users, according to the one or more physical addresses reported by the target user terminal and the other user terminals.

In some embodiments, when the system receives the same physical address from the target user terminal and from one or more of the other user terminals, the system can determine that a certain level of relationship exists between the target user and one or more users associated with the one or more of other user terminals. For example, when the system receives information about the same MAC address of an access point from a target user terminal (associated with the target user) and a second user terminal (associated with the other user), the system can determine that the two users live very close to each other. Based on that, the system can then determine that a close relationship exists between the two users.

In some embodiments, the system can also determine other types of user relationship based on a specific time period when a reporting of the physical address is received. For example, if the system receives a reporting of the physical address from the user terminals during a work time (e.g., 9:00 am-5:00 pm), the system can determine that a work colleague relationship exists between the users associated with the user terminals. As another example, if the system receives a reporting of the physical address from the user terminals during an after-work time (e.g., 7:00 pm-12:00 am), the system can determine that a family relationship exists between the users associated with the user terminals.

In some embodiments, the system can use other additional information to improve the accuracy of the determination about the user relationship. For example, the system can further determine a number of times of receiving the reporting of a physical address from the target user terminal, and refine the determination about the user relationship accordingly. Such an arrangement can prevent a determination of the relationship based on receiving inadvertent reporting of physical addresses from the user terminals. For example, the other user may not live close to the target user. Instead, the other user is a courier delivering goods to the target user. During the delivery, the other user terminal can detect the MAC address of the aforementioned access point and reports the physical address to the system, albeit briefly.

To avoid mistaking the other user as having a close relationship with the target user in the aforementioned scenario, after receiving the same physical address from the target user terminal and the other user terminal, the system can determine a number of times of receiving a reporting of the physical address, within a certain duration, from the other user terminals. An overlap coefficient $R_1$ can be used as a first threshold value. If the number of times of receiving the reporting is larger than $R_1$, the system can determine that that a close relationship exists between the two users. On the other hand, if the number of times of receiving the reporting is below $R_1$, the system can disregard that physical address in determining the user relationship.

In some embodiments, different $R_1$ values can be set for different geographic areas based on, for example, expected mobility differences of users in those geographic areas. For example, based on the received geographical location information from a target user terminal, and additional information associated with these geographical locations (e.g., area coordinates, building types within the area represented by the area coordinates, etc.), the system can determine that the target user is located in an area of greater personnel mobility (e.g., an airport). The system can then set the $R_1$ value to a value (e.g., 5) larger than in a case where the target user is determined to be located in an area of lower personal mobility (e.g., a residence community), where the $R_1$ value can be set to a lower value, such as 2.

In some embodiments, where the system receives a plurality of physical addresses from a target user terminal, the system can select one of the received physical addresses and determine the relationship between the target user and other users based on the selected physical address, and the physical addresses received from other user terminals.

In some embodiments, the system can select the physical address, received from the target user terminal, based on a result of clustering of the received geographical locations. For example, the system can disregard a physical address that is associated with separate wireless signal sources located at different geographical locations.

Such an arrangement can further improve the accuracy of determining the relationship. For example, a system may receive an identical physical address from two user terminals, and determine that the two users have a close relationship accordingly. The system's determination can be based on an incorrect assumption that the two user terminals access a single wireless access point associated with that physical address, when in fact two different wireless access points, located at different geographical locations, are associated with that physical address. The likelihood of making such an incorrect assumption can be mitigated when the system disregards physical addresses that are associated with wireless signal sources located in different geographical locations.

With such an arrangement, the system can also disregard a physical address of a mobile wireless signal source that has different geographical locations because the mobile wireless signal source moves around.

In some embodiments, the selection of a received physical address based on a result of clustering of the received geographical locations includes the following steps:

First, the system determines a clustering radius. The clustering radius can be determined based on a covered radius of the wireless signal source (e.g., 200 m).

Second, the system clusters the geographical locations, received from the target user terminal and/or the other user terminals together with a particular physical address, based on the clustering radius. The system can determine a number of the received geographical locations that are within a clustering region with a radius equal to the clustering radius, based on the coordinates associated with the geographical locations.

As an illustrative example, the system receives 100 location coordinates. Among the received location coordinates, 20 of them are provided by the target terminal, and 80 of them are provided by the other user terminals. After clustering the received location coordinates with the clustering radius, the system can determine that all of the 100 location coordinates are within a clustering region with a radius equal to 200 meters (the clustering radius). Based on this, the system can select the physical address associated with these location coordinates for the user relationship determination. If the system determines that not all of the 100 location coordinates are within the clustering region, the system can determine the physical address of the wireless signal source as invalid physical address.

In some embodiments, if a percentage of the geographical locations associated with the physical address that are within the clustering region reaches a threshold percentage (e.g., 75%), the system will determine to select the particular physical address for the user relationship determination. If that percentage is below the threshold percentage, the system will determine to disregard the particular physical address for the user relationship determination.

In some embodiments, before clustering a received physical address based on the received geographical locations as described above, the system can first determine a number of times of receiving the reporting of the physical address from the target user terminal. If the number of times reaches a second threshold value, the system can designate the physical address as a candidate physical address. The system can then cluster the geographical locations associated with the candidate physical address as described above, and based on the clustering result, determine whether the candidate physical address is to be selected for user relationship determination.

Such an arrangement can filter out short-term fluctuating data from being used for user relationship determination. For example, a target user terminal may be searching for free Wi-Fi network in a public area, and provides the physical address of an Access Point of that Wi-Fi network to the system. In this case, the target user terminal may have provided the physical address of the Access Point only for a small number of times that is below the second threshold value, and the physical address is not designated as a candidate physical address for clustering. Therefore, even if other user terminals can have also provided the physical address of the same Access Point to the system, indicating that both the target terminal and the other user terminals access the same Access Point, such an indication is temporary and short-term in nature. The system can avoid using such a temporary indication to determine that a relationship exists between the target user and the other users, when the physical address of that Access Point is filtered out.

In some embodiments, the system determines a number of times of receiving information, from the target user terminal, about a physical address. If the number of times exceeds a third threshold value, the system can determine to use the physical address for the user relationship determination.

In some embodiments, the system can determine, based on the received physical address, one or more candidate users whose relationship with the target user is to be determined. The system then determines one or more relationships between the target user and the candidate users based on the received geographical location information. The system can determine one or more candidate users based on at least one of the following conditions:

1. The system receives the same physical address from the candidate user terminal and from the target user terminal;
2. The system receives the same physical address from the candidate user terminal and from the target user terminal, and the system has received, within a certain duration, a reporting of the physical address from the candidate user terminal for a number of times that exceeds the first threshold value; and
3. The system receives the same physical address from the candidate user terminal and from the target user terminal, and the system has received, within a certain duration, a reporting of the physical address from the target user terminal for a number of times that exceeds the third threshold value.

After determining the one or more candidate users, the system can then determine one or more relationships between the target user and the candidate users based on the received geographical location information, which the target user terminal and the candidate user terminals report to the system while searching for a wireless signal source.

Such an arrangement can further improve the accuracy of determining the relationship. For example, as described before, a system may receive an identical physical address from two user terminals, and determine that the two users have a close relationship accordingly. The system's determination can be based on an incorrect assumption that the two user terminals search for a single wireless access point associated with that physical address, when in fact two different wireless access points, located at different geographical locations, are associated with that physical address. The likelihood of making such an incorrect assumption can be mitigated when the system determines that the two users do not have close relationship, based on a distance between the geographical locations received from the target user terminal and from the other user terminal.

Figure 2:
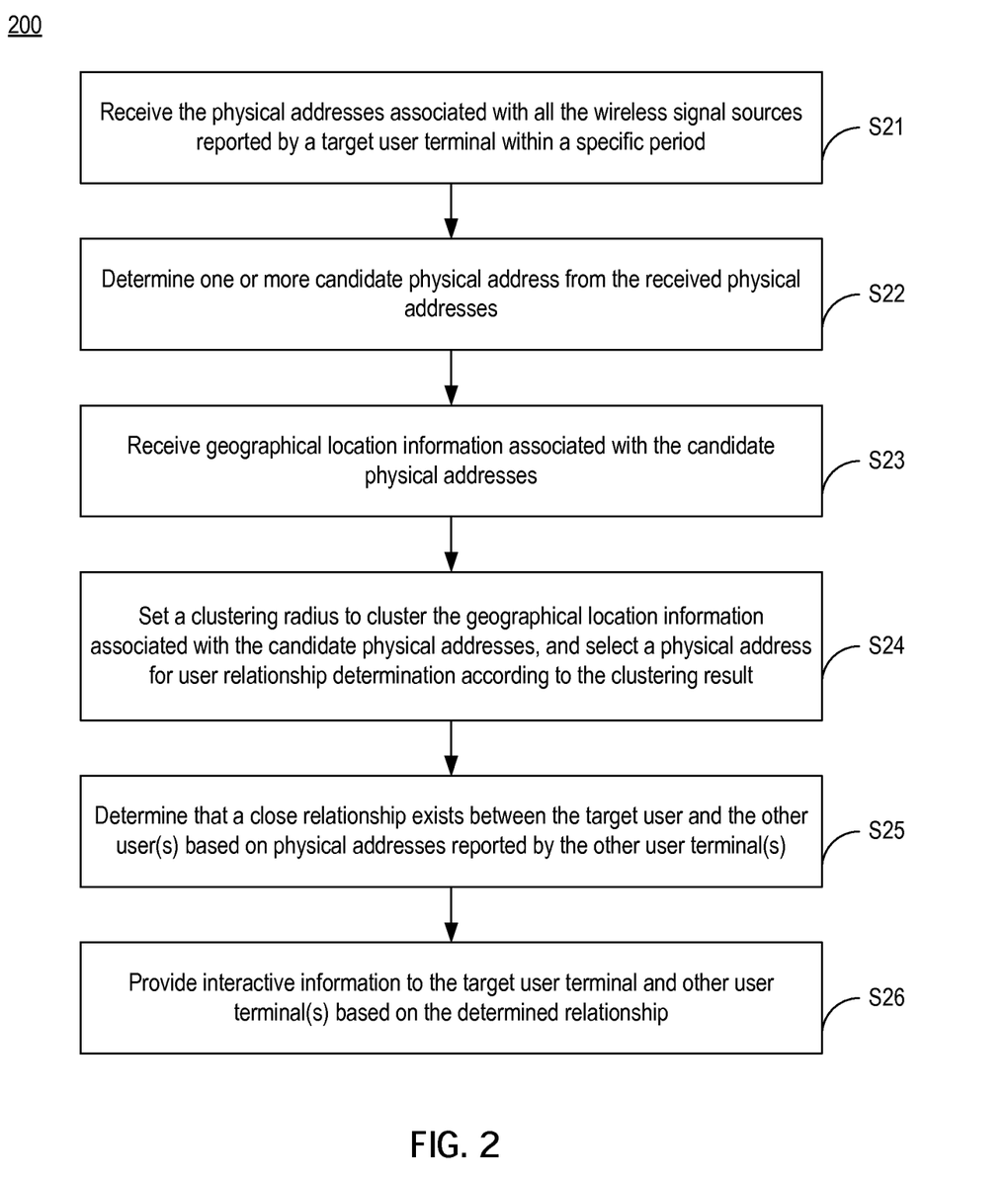
FIG. 2 is a flowchart of an exemplary method for determining a relationship between users and providing information to the users, consistent with embodiments of the present disclosure.

The aforementioned user relationship information can be used for other applications, such as providing interactive information to a set of users based on the determined user relationships. Reference is now made to FIG. 2, which is a flowchart of an exemplary method 200 for determining a relationship between users and providing information to the users, consistent with embodiments of the present disclosure. Method 200 can be performed by a computer, a server, or any computer system configured to determine user relationship. While the method is described as being performed by a system, it is appreciated that different devices can also perform different steps of method 200. Referring to FIG. 2, method 200 includes the following steps.

In step S21, the system receives the physical addresses associated with all the wireless signal sources reported by a target user terminal within a specific period.

In step S22, the system determines one or more candidate physical addresses from the received physical addresses. The system can determine an overlap coefficient $Ratio_1$, and disregard physical addresses whose number of reporting is below $Ratio_1$. The system can then select the remaining physical addresses as the candidate physical addresses. In some embodiments, to conserve server resources, the system can also determine a number of times of receiving, within a certain duration, the reporting of physical addresses from other user terminals, to determine a level of relationship between the target user and other users, as described in FIG. 1.

In step S23, the system receives the geographical location information associated with the candidate physical addresses determined in step 22. The target user terminal and/or the other user terminals can report their geographical locations, together with the candidate physical address associated with the wireless signal source, when the terminals discover the wireless signal source.

In step S24, the system sets a clustering radius to cluster the geographical location information associated with the candidate physical addresses, and selects a physical address for user relationship determination according to the clustering result. In some embodiments, the system clusters and selects the physical address for user relationship determination according to the embodiments of the present disclosure as described above.

In step S25, the system receives information about one or more physical addresses from other user terminals. The system then select the user terminals that report a physical address that is identical to the physical address selected in step 24, if the number of times of reporting that physical address exceeds an overlap coefficient $Ratio_2$. The system can then determine that that a close relationship exists between the user associated with the selected user terminal and the target user associated with the target user terminal.

In step S26, the system provides interactive information to the target user terminal and other users terminals based on the determined relationships from step 25, when the system receives information about a specific event associated with the target user. For example, during Chinese New Year, the system can prompt a target user to send an electronic message, such as an electronic gift, an electronic red envelop, an electronic greeting message, etc. The system can provide a list of users determined (in step 25 of method 200) to have a close relationship with the target user. The target user can then select one or more users to receive the electronic message. After the system receives a selection of the users from the list and the electronic message to be sent to the selected users, the system can then transmit the electronic message to the user terminals associated with the selected users.

As another illustrative example, a few days before the birthday of the target user, the system can remind other users with whom the target user has a close relationship, as determined in step 25 of method 200, to send an electronic message to the target user via their user terminals.

As another illustrative example, step 26 can be provided by an electronic payment system (e.g., Alipay AA) that enables a payor for a group activity (e.g., a group dinner) to receive payment from other participants to the group activity. After the payor makes the payment, the system can provide, via the payor's terminal, a list of users determined (in step 25 of method 200) to have a close relationship with the payor. The payor can then select one or more users from the list to receive a request for payment. After the system receives a selection of the users from the list, the system can then transmit the request for payment to the user terminals associated with the selected user.

Figure 3:
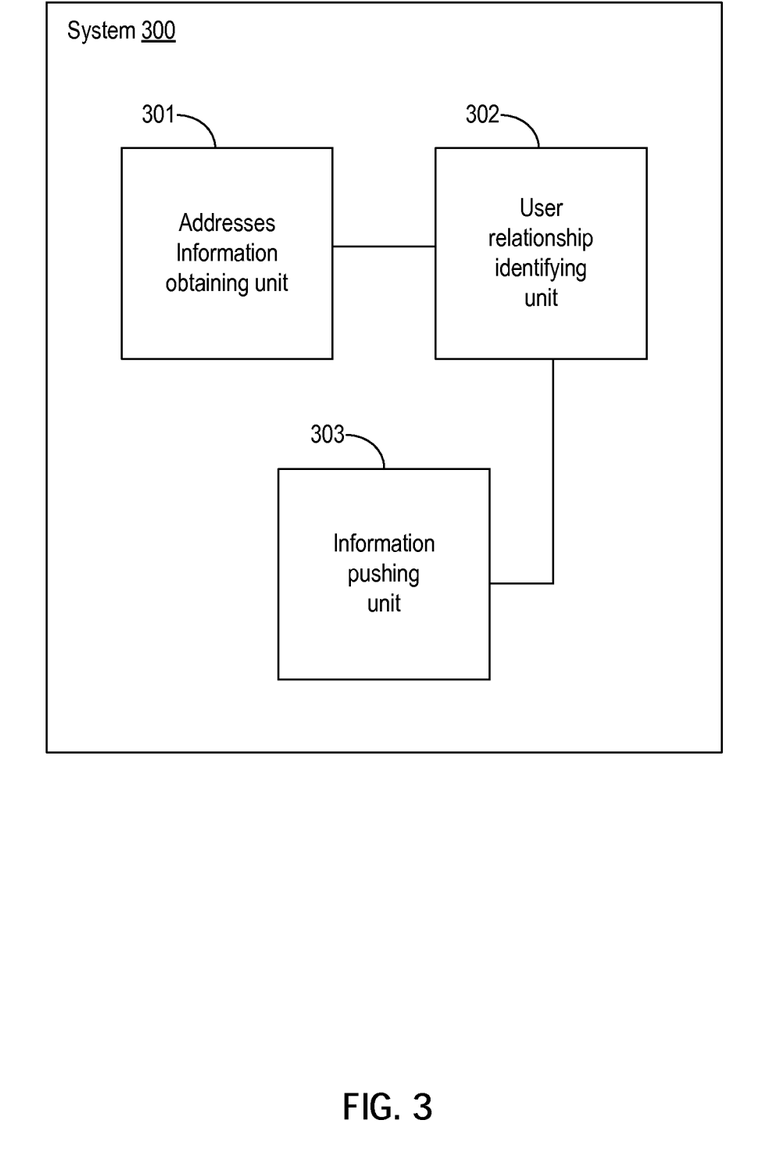
FIG. 3 is a block diagram of an exemplary system for determining a relationship between users and providing information to the users, consistent with some embodiments of this disclosure.

FIG. 3 is a block diagram of an exemplary system 300 for determining a relationship between users and providing information to the users, consistent with some embodiments of this disclosure. The system may be a server, a PC, a smart phone, a tablet computer, or the like. Referring to FIG. 3, system 300 includes an addresses information obtaining unit 301, a user relationship identifying unit 302, and an information pushing unit 303.

In some embodiments, addresses information obtaining unit 301 is configured to receive physical addresses associated with wireless signal sources from a target user terminal and other user terminals. In some embodiments, addresses information obtaining unit 301 is configured to perform, for example, step S11 of method 100 as described before. The physical address received can be associated with a wireless signal source searched by the target user terminal and the other user terminals.

In some embodiments, user relationship identifying unit 302 is configured to determine a relationship between users (e.g. between a target user and other users) based on the physical addresses received by addresses information obtaining unit 301. In some embodiments, user relationship identifying unit 302 is configured to perform, for example, step S12 of method 100 and steps S21-S25 of method 200 as described before.

In some embodiments, information pushing unit 303 is configured to provide interactive information to the target user and to other users determined (e.g., by user relationship identifying unit 302) to have a close relationship with the target user. In some embodiments, information pushing unit 303 is configured to perform, for example, step S26 of method 200 as described before. The interactive information can include, for example, a list of users to be selected to receive an electronic message (e.g., an electronic greeting). The interactive information can also be provided after system 300 receives information about a specific event (e.g., the birthday of the target user, a festival, etc.).

As will be understood by those skilled in the art, embodiments of the present disclosure may be embodied as a method, a system or a computer program product. Accordingly, embodiments of the present disclosure may take the form of an entirely hardware embodiment, an entirely software embodiment or an embodiment combining software and hardware. Furthermore, embodiments of the present disclosure may take the form of a computer program product embodied in one or more computer available storage media (including but not limited to a magnetic disk memory, a CD-ROM, an optical memory and so on) containing computer available program codes. The storage media include non-volatile and volatile media, removable and non-removable media, wherein information storage can be implemented with any method or technology. Information may be modules of computer readable instructions, data structures and programs or other data. Examples of a computer storage medium include, but are not limited to, a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices or any other non-transmission media which may be used to store information capable of being accessed by a computer device. According to the definition of the context, the computer readable medium does not include transitory media, such as modulated data signals and carrier waves.

It will also be understood that each flow and/or block of the flow diagrams and/or block diagrams, and combinations of flows and/or blocks in the flow diagrams and/or block diagrams, can be implemented by computer program instructions. These computer program instructions may be provided to a processor of a general-purpose computer, a special-purpose computer, an embedded processor, or other programmable data processing devices to produce a machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer readable memory that can direct a computer or other programmable data processing devices to function in a particular manner, such that the instructions stored in the computer readable memory produce a manufactured product including an instruction means which implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions which are executed on the computer or other programmable devices provide steps for implementing the functions specified in one or more flows in the flow diagrams and/or one or more blocks in the block diagrams.

In a typical configuration, a computer device includes one or more Central Processing Units (CPUs), an input/output interface, a network interface and a memory.

The memory may include forms of a volatile memory, a random access memory (RAM) and/or non-volatile memory and the like, such as a read-only memory (ROM) or a flash RAM in a computer readable medium. The memory is an example of the computer readable medium.

It will be further noted that the terms "comprises", "comprising" or any other variations are intended to cover non-exclusive inclusions, so as to cause a process, method, commodity or device comprising a series of elements to not only comprise those elements, but also comprise other elements that are not listed specifically, or also comprise elements that are inherent in this process, method, commodity or device. Therefore, the element defined by a sentence "comprising a . . . " does not preclude the presence of other same elements in the process, method, commodity or device including said elements under the condition of no more limitations.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-method for determining relationship between users, comprising:
   receiving, from a target user terminal and one or more other user terminals, one or more physical addresses referring to one or more wireless signal sources; and
   determining one or more relationships between a target user associated with the target user terminal and one or more other users associated with the one or more other user terminals based on the received one or more physical addresses by:
      determining a number of times of receiving a physical address from the target user terminal;
      determining whether the number of times of receiving the physical address from the target user terminal exceeds a threshold value; and
      responsive to a determination that the number of times of receiving the physical address from the target user terminal exceeds the threshold value:
         determining a second number of times of receiving the physical addresses from the one or more other user terminals within a duration,
         determining whether the second number of times exceeds a second threshold value, wherein the second threshold value is set differently for different geographic areas associated with the physical address based on expected mobility differences of the target user in the geographic areas, and
         responsive to determining that the second number of times exceeds the second threshold value, determining that a relationship exists between the target user and the one or more other users,
   wherein the one or more wireless signal sources are within search ranges of the target user terminal and the one or more other user terminals.

2. The method of claim 1, further comprising:
   receiving geographical location information associated with the received one or more physical addresses,
   wherein the determining one or more relationships between a target user associated with the target user terminal and one or more other users associated with the one or more other user terminals based on the received one or more physical addresses comprises:
      determining, based on the received physical addresses, one or more candidate users whose relationship with the target user is to be determined; and
      determining the relationship between the target user and the one or more candidate users based on the received geographical location information.

3. The method of claim 1, wherein the determining one or more relationships between a target user associated with the target user terminal and one or more other users associated with the one or more other user terminals based on the received one or more physical addresses comprises:
   selecting a physical address from the physical addresses received from the target user terminal for a determination of the one or more relationships; and
   determining the relationship between the target user and other users based on the selected physical address and the physical addresses received from the one or more other user terminals.

4. The method of claim 3, further comprising:
   receiving geographical location information associated with the received one or more physical addresses,
   wherein the selecting a physical address from the physical addresses received from the target user terminal comprises:
      clustering at least some of received physical addresses from the target user terminal based on received geographical location information; and
      selecting the physical address based on a result of the clustering.

5. The method of claim 4, further comprising:
   determining a number of times of receiving a physical address from the target user terminal;
   determining whether the number of times exceeds a threshold value; and
   responsive to determining that the number of times exceeds a threshold value, designating the physical address for the clustering.

6. The method of claim 1, wherein the determining one or more relationships between a target user associated with the target user terminal and one or more other users associated with the one or more other user terminals based on the received one or more physical addresses comprises:
   determining whether at least one of the physical addresses received from the target user terminal and at least one of the physical addresses received from the one or more user terminals is identical; and
   responsive to determining that at least one of the physical addresses received from the target user terminal and at least one of the physical addresses received from the one or more user terminals is identical, determining that a relationship exists between the target user and the one or more other users.

7. The method of claim 1, wherein the one or more relationships between a target user associated with the target user terminal and one or more other users associated with the one or more other user terminals are determined based on a time period associated with the received one or more physical addresses.

8. The method of claim 7, wherein if the time period occurs during a working time period, the one or more relationships are determined to be a work colleague relationship; and wherein if the time period occurs during an after-work time period, the one or more relationships are determined to be a family relationship.

9. The method of claim 1, further comprising:
providing interactive information to the target user and/or the one or more other users after determining that a relationship exists between the target user and the one or more other users.

10. The method of claim 9, further comprising:
receiving information about a specific event,
wherein the interactive information is provided based on the received information about the specific event.

11. The method of claim 1, wherein the one or more physical addresses comprise a media access control address.

12. The method of claim 1, wherein the one or more relationships between the target user and the one or more other users are preexisting relationships between the target user and the one or more other users.

13. The method of claim 12, wherein the one or more relationships between the target user and the one or more other users comprise at least one of family relationship, colleague relationship and neighboring relationship.

14. A device for determining relationship between users, comprising:
a memory storing instructions, and
a processor configured to execute the instructions to cause the device to perform:
  receiving, from a target user terminal and one or more other user terminals, one or more physical addresses referring to one or more wireless signal sources; and
  determining one or more relationships between a target user associated with the target user terminal and one or more other users associated with the one or more other user terminals based on the received one or more physical addresses by:
    determining a number of times of receiving a physical address from the target user terminal;
    determining whether the number of times of receiving the physical address from the target user terminal exceeds a threshold value; and
    responsive to a determination that the number of times of receiving the physical address from the target user terminal exceeds the threshold value:
      determining a second number of times of receiving the physical address from the one or more other user terminals within a duration;
      determining whether the second number of times exceeds a second threshold value, wherein the second threshold value is set differently for different geographic areas associated with the physical address based on expected mobility differences of the target user in the geographic areas, and
      responsive to determining that the second number of times exceeds second threshold value, determining that a relationship exists between the target user and the one or more other users,
wherein the one or more wireless signal sources are within search ranges of the target user terminal and the one or more other user terminals.

15. The device of claim 14, wherein the processor is further configured to execute the instructions to cause the device to perform:
receiving geographical location information associated with the received one or more physical addresses,
wherein the determination of one or more relationships between a target user associated with the target user terminal and one or more other users associated with the one or more other user terminals based on the received one or more physical addresses comprises:
  determining, based on the received physical addresses, one or more candidate users whose relationship with the target user is to be determined; and
  determining the relationship between the target user and the one or more candidate users based on the received geographical location information.

16. The device of claim 14, wherein the determination of one or more relationships between a target user associated with the target user terminal and one or more other users associated with the one or more other user terminals based on the received one or more physical addresses comprises:
  selecting a physical address from the physical addresses received from the target user terminal for a determination of the one or more relationships; and
  determining the relationship between the target user and other users based on the selected physical address and the physical addresses received from the one or more other user terminals.

17. The device of claim 16, wherein the processor is further configured to execute the instructions to cause the device to perform:
receiving geographical location information associated with the received one or more physical addresses,
wherein the selecting a physical address from the physical addresses received from the target user terminal comprises:
  clustering at least some of received physical addresses from the target user terminal based on received geometric location information; and
  selecting the physical address based on a result of the clustering.

18. The device of claim 17, wherein the processor is further configured to execute the instructions to cause the device to perform:
  determining a number of times of receiving a physical address from the target user terminal;
  determining whether the number of times exceeds a threshold value; and
  responsive to determining that the number of times exceeds the threshold value, designating the physical address for the clustering.

19. The device of claim 14, wherein the determination of one or more relationships between a target user associated with the target user terminal and one or more other users associated with the one or more other user terminals based on the received one or more physical addresses comprises:
  determining whether at least one of the physical addresses received from the target user terminal and at least one of the physical addresses received from the one or more user terminals is identical; and
  responsive to determining that at least one of the physical addresses received from the target user terminal and at least one of the physical addresses received from the one or more user terminals is identical, determining that a relationship exists between the target user and the one or more other users.

20. The device of claim 14, wherein the one or more relationships between a target user associated with the target user terminal and one or more other users associated with the one or more other user terminals are determined based on a time period associated with the received one or more physical addresses.

21. The device of claim 20, wherein if the time period occurs during a working time period, the one or more relationships are determined to be a work colleague relationship; and wherein if the time period occurs during an after-work time period, the one or more relationships are determined to be a family relationship.

22. The device of claim 14, wherein the processor is further configured to execute the instructions to cause the device to perform providing interactive information to the target user and/or the one or more other users after determining that a relationship exists between the target user and the one or more other users.

23. The device of claim 22, wherein the processor is further configured to execute the instructions to cause the device to perform:
receiving information about a specific event,
wherein the interactive information is provided based on the received information about the specific event.

24. A non-transitory computer readable medium that stores a set of instructions that is executable by one or more processors of an apparatus to cause the apparatus to initiate a method for determining relationship between users, the method comprising:
receiving, from a target user terminal and one or more other user terminals, one or more physical addresses referring to one or more wireless signal sources; and
determining one or more relationships between a target user associated with the target user terminal and one or more other users associated with the one or more other user terminals based on the received one or more physical addresses by:
determining a number of times of receiving a physical address from the target user terminal;
determining whether the number of times of receiving the physical address from the target user terminal exceeds a threshold value; and
responsive to a determination that the number of times of receiving the physical address from the target user terminal exceeds the threshold value:
determining a second number of times of receiving the physical addresses from the one or more other user terminals within a duration,
determining whether the second number of times exceeds a second threshold value, wherein the second threshold value is set differently for different geographic areas associated with the physical address based on expected mobility differences of the target user in the geographic areas, and
responsive to determining that the second number of times exceeds the second threshold value, determining that a relationship exists between the target user and the one or more other users,
wherein the one or more wireless signal sources are within search ranges of the target user terminal and the one or more other user terminals.

* * * * *

UNITED STATES PATENT AND TRADEMARK OFFICE
CERTIFICATE OF CORRECTION

PATENT NO. : 10,698,979 B2
APPLICATION NO. : 14/841966
DATED : June 30, 2020
INVENTOR(S) : Lei Pang Page 1 of 1

It is certified that error appears in the above-identified patent and that said Letters Patent is hereby corrected as shown below:

On the Title Page

Item (30), under "Foreign Application Priority Data," "2014 1 0443214" should read --201410443214.6--.

Signed and Sealed this
Twenty-eighth Day of June, 2022

Katherine Kelly Vidal
*Director of the United States Patent and Trademark Office*